United States Patent [19]
McIntosh

[11] Patent Number: 4,793,866
[45] Date of Patent: Dec. 27, 1988

[54] METHOD AND APPARATUS FOR REMOVING SOLID PROPELLANT FROM ROCKET MOTOR CASES

[75] Inventor: Meldon J. McIntosh, North Ogden, Utah

[73] Assignee: Morton Thiokol, Inc., Chicago, Ill.

[21] Appl. No.: 808,791

[22] Filed: Dec. 13, 1985

[51] Int. Cl.⁴ .......................... B08B 3/02; B08B 9/08
[52] U.S. Cl. .................................. 134/24; 134/168 R
[58] Field of Search ................ 134/22.12, 22.18, 24, 134/107, 167 C, 167 R, 168 C, 168 R; 60/253, 255

[56] References Cited

U.S. PATENT DOCUMENTS

| | | | |
|---|---|---|---|
| 3,113,046 | 12/1963 | Reddick et al. | 134/24 |
| 3,312,231 | 4/1967 | Monroe et al. | 134/24 |
| 3,440,096 | 4/1969 | Scott | 134/24 |
| 3,990,369 | 11/1976 | Sayles | 102/531 |
| 4,054,029 | 10/1977 | Sayles | 60/253 |
| 4,508,577 | 4/1985 | Conn et al. | 134/24 |

OTHER PUBLICATIONS

"Large Segmented, Fiberglass Reinforced Plastic Rocket Motor Cases . . . ,", Walker et al., Tech. Report; (Abs. only).

"Development of Fiberglass Segmented Rocket Motor Case", Jacobson, H. R., Douglas Aircraft Report (Abs. only).

Primary Examiner—Thomas H. Tarcza
Assistant Examiner—Ian J. Lobo
Attorney, Agent, or Firm—James C. Simmons; Gerald K. White

[57] ABSTRACT

A process and apparatus for removing solid propellant from a rocket motor case. Water is heated to a temperature of at least about 150° Fahrenheit, pressurized to a pressure within the range of about 600 to 1200 psi, focused into a jet, and directed while moving relative to the propellant surface at an angle relative to the propellant surface which is in the range of about 15 to 45 degrees from a stand-off distance of up to about 20 inches.

17 Claims, 1 Drawing Sheet

METHOD AND APPARATUS FOR REMOVING SOLID PROPELLANT FROM ROCKET MOTOR CASES

The U.S. Government has rights in this invention pursuant to contract FO4611-81-C-0001 awarded by the Department of the Air Force.

This invention relates to the reclaiming of loaded solid propellant rocket motor cases. More particularly, this invention relates to a method and apparatus for removing solid propellant from rocket motor cases including those made of fiber and resin composites by the use of pressurized jets of water.

It may sometimes become necessary for various reasons to remove solid propellant from a rocket motor case and replace the propellant. Solid propellant for rocket motors is typically composed of solid particles of oxidizer and aluminum powder fuel bound together with a synthetic rubber-like material. The resulting material is of a constituency that may be torn apart and shredded by jets of water at ambient temperature and a pressure in the range of 4,000 to 6,000 pounds per square inch (psi) such as disclosed in U.S. Pat. No. 3,312,231 to Monroe et al which patent is hereby incorporated herein by reference and made a part hereof for the purpose of disclosing in detail one type of apparatus for supplying pressurized jets of water to a solid propellant surface for removal of a solid propellant from a rocket motor case. The method and apparatus disclosed in the Monroe et al patent are satisfactory for typical steel cases since such cases are impervious to the high pressures of 4,000 to 6,000 psi which have heretofore been required with water of ambient temperature for removing the solid propellant. However, the use of such a process with a rocket case made of composites or fiberglass, aramid, graphite, and the like filled with a resin invariably results in damage to the case.

It is therefore an object of the present invention to provide a method and apparatus for removal of solid propellant from rocket motor cases which are composed of fiber and resin composites without causing damage to the cases.

It is a further object of the present invention to provide such a method and apparatus wherein solid propellant may be removed from rocket motor cases composed of steel as well as fiber and resin composites without causing damage to the insulation as well as the case.

It is another object of the present invention to provide such a method which is safe, efficient, and cost effective.

It is yet another object of the present invention to provide such an apparatus which is inexpensive yet rugged and reliable.

The above and other objects, features, and advantages of this invention will be apparent in the following detailed description of the preferred embodiments thereof which is to be read in connection with the accompanying drawings.

DETAILED DESCRIPTION OF THE PREFERRED EMBODIMENTS

Figure 1:
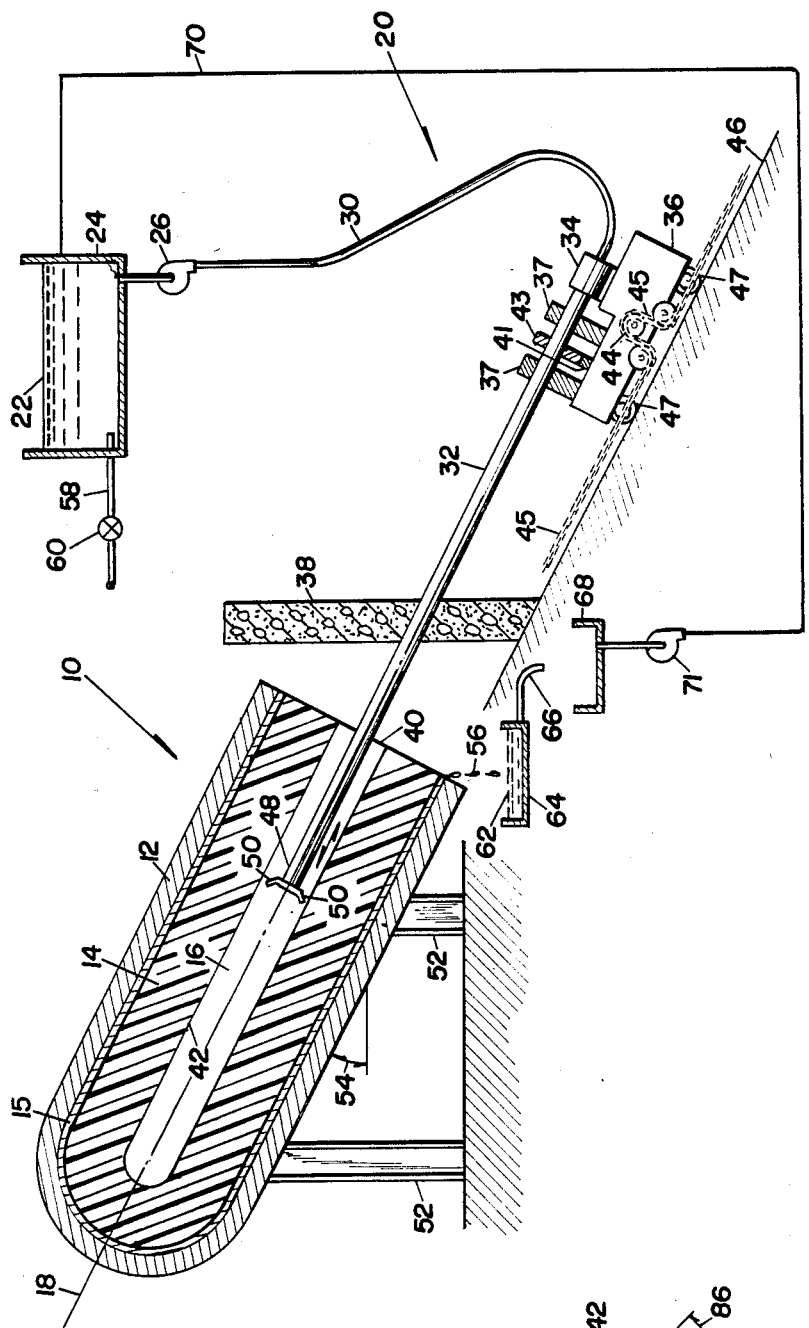
FIG. 1 is a view, partially in section and partially schematic, illustrating a rocket motor and apparatus embodying the present invention in position for reclaiming the case thereof.

Referring to FIG. 1, there is illustrated generally at 10 in cross-section a typical rocket motor which includes a case 12 which is generally cylindrical in shape and which has been filled with a solid propellant 14 which has been cast therein. Typically positioned between the case 12 and propellant 14 are a layer of insulation material 15 and a liner (not shown) for effecting bonding between the propellant and insulation material 15. Typically, the case 12 may be composed of steel, or it may be composed of any other suitable material such as a composite of a resin such as an epoxy and a fiber material such as fiberglass, graphite, or aramid fiber. A typical solid propellant formulation for such a rocket motor 10 which may be reclaimed in accordance with the present invention may comprise the following wherein the percentages are by weight:

| Ammonium Perchlorate | Aluminum Powder | Iron Oxide | HB Polymer | ECA (Epoxy Curative) |
|---|---|---|---|---|
| 69.7% | 16.0% | 0.3% | 12.1% | 1.9% |

Typically, the solid propellant is cast in the rocket motor case 12 with a cavity illustrated at 16 which extends longitudinally of the rocket motor case 12 along the central axis illustrated at 18 of the case and propellant in order to provide what might be termed a combustion chamber wherein a large surface area may be provided for rapid burning of the propellant 14. Typically, such cavities 16 are provided with a shape suitable for the particular burning characteristics desired of the propellant for the particular type of rocket motor and may thus typically have a star-shaped or circular cross-sectional shape (in a plane perpendicular to the central axis 18). For ease of illustration of the invention, FIG. 1 shows the cavity 16 to have a circular cross-sectional shape.

Generally illustrated at 20 is apparatus for use to reclaim the rocket motor 10 by removal of the solid propellant 14 therefrom with a water jet without causing damage to the case 12 even if it is composed of a composite of resin and fiber and without causing damage to the insulation 15. A source of water 22 represented by container 24 is connected to a suitable pump 26 adequate to pressurize the water to a pressure in the range of about 600 to 1200 psi and which takes suction from the water source. The discharge of the pump 26 is connected to one or more flexible hoses 30 which in turn connect to a rotatable hollow boom 32 by means of a high pressure slip gland 34. Suitable valves may be provided in the lines to and from the pump 26 as required in accordance with engineering principles of common knowledge to those of ordinary skill in the art to which this invention pertains. The boom 32 may typically be comprised of 2½ inch diameter tubing in telescoping relation with a surrounding tube and may be supported on vehicle 36 by supports 37 and further supported by support 38 with one end cantileverly extending beyond the support 38 for insertion in the open end 40 of the rocket motor case 12 into the cavity 16 to extend in an axial direction of the case for the purpose of cantileverly positioning one or more nozzles 50 so that they may direct one or more jets of the water against the cavity surface illustrated at 42. In order to protect the pump room area from damage in the event of a fire in the rocket motor being reclaimed, support 38 is preferably a concrete wall having a thickness of three feet or more. The boom 32 is rotatable with variable speed and direction by means preferably of a variable speed and direction hydraulic donkey drive mechanism illustrated schematically at 41 which rotates gear wheel 43 attached to the boom 32 for rotation thereof so that the nozzles 50 may be rotationally moved, as illustrated at 88 in FIG. 2, for re-directing water jets circumferentially over the propellant surface. The vehicle 36 is movable up inclined surface 46 preferably by means of chain drive mechanism illustrated schematically at 44 which pulls the vehicle along chain 45 with idle wheels 47 supporting the vehicle 36 for controlling the movement of the end portion 48 of the boom 32 carrying the water jet nozzles 50 in an axial direction, illustrated at 90 in FIG. 2, of the rocket motor case 12 so that the nozzles 50 may be moved in an axial direction 90 inside of the case 12 for re-directing water jets in a direction axially of the case as well as rotationally over the propellant surface. The rocket motor 10 to be reclaimed is supported on supports 52. In order to remove waste water and pieces of severed propellant from the rocket motor 10, as illustrated by the waste water droplets 56, the rocket motor 10 is oriented at an angle illustrated at 54 of typically 30 degrees with the rocket motor end 40 directed downwardly, and incline 46 is oriented at the same angle 54 for aligning the boom 32 in the rocket motor along the axis 18. To the extent it has so far been described, apparatus 20 is typical of apparatus such as described in the Monroe et al patent (previously cited) which has been conventionally used to reclaim steel rocket motor cases. The portions of the apparatus 20 which have so far been described are well known to those of ordinary skill in the art to which this invention pertains and will not therefore be described in greater detail herein.

In order to heat the water to a temperature of at least about 150° Fahrenheit in accordance with the present invention for purposes which will hereinafter be described, there is provided a suitable heating means such as, for example, a steam sparging system illustrated by steam line 58 for injecting steam into the water at the head tank 24. There is also provided means such as valve 60 which may be manually or automatically controlled for controlling the water temperature.

In order to conserve the heated water, in accordance with a preferred embodiment of the this invention, after the water 56 is strained through filter 62 into tank 64 and thereafter drained through line 66 into tank 68, it is returned to the head tank 24 through line 70 and pump 71.

Figure 2:
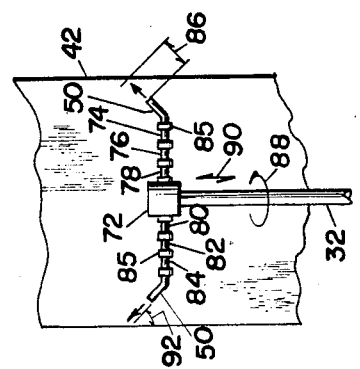
FIG. 2 is a view illustrating an arrangement of nozzles positioned in relation to a solid propellant surface for reclaiming a rocket motor case in accordance with the present invention.

Referring to FIG. 2, there is shown the end portion 48 of the boom 32 which is attached to a manifold 72 from which extends one or more of the nozzles 50, for example, four nozzles circumferentially spaced at 90° angles to each other.

The use of jets of water at ambient temperature and a pressure in the range of 4,000 to 6,000 psi, as taught in the Monroe et al patent, is not only effective to cut through and remove the propellant material 14, but also will cut through any layer of insulation material for removal thereof, and, if the case 12 is of a fiber and resin composite or the like, may cut into the case or otherwise damage it. In order to prevent such damage to the case 12 while maintaining effective water jet application against the propellant surface 42 for removal of the propellant 14 in accordance with the process of the present invention, the water is heated to a temperature which is at least about 150° Fahrenheit by heating means 58, and the water temperature is controlled by manual or automatic operation of valve 60 or by other suitable temperature control means. The heated water is pressurized by pump 26 to a pressure within the range of about 600 to 1200 psi, discharged through flexible line 30 and boom 32, and then focused into one or more water jets at the nozzles 50 for directing the water jets against the propellant surface 42. Although many conventional solid propellants may be removed using such lowered pressures and increased temperatures, some such as HTPB based propellants may be less easily removed or perhaps not removable at all.

The water should not be heated to a temperature greater than that which may damage components in the rocket motor. For example, if it is desired to salvage the layer of insulation, the water temperature should be controlled so that it is lower than the curing temperature of the insulation, i.e., typically about 300° Fahrenheit. Preferably, the water temperature should be maintained at a temperature which is not over about 200° Fahrenheit.

If the water is pressurized to less than about 600 psi, a greater length of time than may be desired is taken to remove the propellant. On the other hand, if the water is pressurized to a pressure greater than about 1200 psi, damage may result to the insulation 15 or to the case 12 if it is of fiber and resin composite or the like.

Further in accordance with the present invention, each nozzle 50, which may typically contain a 0.1 inch diameter tapered polished aperture and supply about 20 to 30 gpm of water, is connected to a length of short segments of conduit such as segments 74 through 84 which are removably coupled together at coupling members 85 to position the nozzle outlets at a distance illustrated at 86 measured in the direction of flow of the water jet issuing therefrom, which distance is referred to herein and in the claims as the "stand-off distance", from the portion of the propellant surface 42 to be impinged by the water jet. In accordance with the present invention, this stand-off distance 86 is up to about 20 inches since the effectiveness of the nozzles drops off rapidly as the stand-off distance increases above 20 inches. Preferably, the stand-off distance 86 is at least about 3 inches.

Even at pressures between 600 and 1200 psi, as provided by the present invention, if the nozzles are kept stationary for longer than a brief period of time with water jets impinging the same points of the cavity surface 42, damage may still result to the insulation and the case. In order to prevent such damage from resulting as well as efficiently remove propellant in accordance with the present invention, the nozzles 50 are moved continuously relative to the propellant surface 42 such as by rotation illustrated at 88 of the nozzles 50 about the boom 32 at a speed of preferably around one-half to three rpm and by movement of the boom in the direction illustrated at 90 axially in and out of the cavity 16 so as to re-direct the water jets over the propellant surface 42 to effect cuts in the propellant whereby pieces of propellant which are cut therefrom may be removed.

Further in accordance with the present invention, the nozzles 50 are positioned to direct the water jets onto the surface 42 of the propellant at an angle illustrated at 92 relative to the propellant surface 42 which is within the range of about 15 to 45 degrees.

Good results have been obtained when the water is pressurized to a pressure within the range of about 600 and 800 psi, heated to a temperature of about 150° Fahrenheit, and focused into a jet at a stand-off distance 86 from the propellant surface of about 5 inches and at an angle 92 of about 45 degrees.

In accordance with a preferred embodiment of the present invention, the water jets are directed onto the surface 42 of the cavity with a helical motion relative to the surface 42 which is effected by simultaneous motion along the central axis 18 of the propellant in direction 90 and rotary motion illustrated at 88 about the axis so that helical shreds of propellant may be carved by the water jet from the cavity surface. An end burner may be reclaimed in accordance with the process of the present invention after a cavity of suitable diameter is first provided in the propellant along the case axis 18 using water jets or other suitable means.

The spent water 56 is preferably filtered of propellant residue particles and recirculated to the head tank 24 so that it may again be pressurized, focused into a jet, and directed onto the propellant surface. During the reclaiming process, the rocket case is preferably supported in an inclined position at an angle 54 of preferably about 30° so that the water which has been directed onto the propellant surface and the propellant residue may be effectively removed so that the water and propellant residue may be separated and the water thereafter recirculated.

By use of the process of the present invention, not only may a composite fiber and resin motor case 12 be reclaimed without damage thereto, but the layer of insulation 15 between the case 12 and propellant 14 may also be left undamaged and thus salvageable. Thus, if a rocket motor can be reclaimed using the process of the present invention without damaging the layer of insulation 15, it is quite apparent that the chances of effecting damage to the case 12 are remote indeed.

It is to be understood that the invention is by no means limited to the specific embodiments which have been illustrated and described herein, and that various modifications thereof may indeed be made which come within the scope of the present invention as defined by the appended claims.

What is claimed is:

1. A process for removing solid propellant from a rocket motor case composed of a composite of resin and fiber material comprises the steps of:
   a. heating water to a temperature which is at least about 150° F.;
   b. pressurizing the water to a pressure within the range of about 600 to 1200 psi;
   c. focusing the water into a jet;
   d. directing the water jet onto the surface of the propellant from a stand-off distance of up to about 20 inches and at an angle relative to the propellant surface which is within the range of about 15 to 45 degrees; and
   e. re-directing the water jet over the propellant surface to effect cuts in the propellant whereby pieces of propellant which are cut therefrom may be removed.

2. A process according to claim 1 wherein the water is heated to a temperature which is less than about 200° F.

3. A process according to claim 1 including providing a nozzle having a tapered aperture with a diameter of about 0.1 inch at its outlet for focusing the water into a jet; and maintaining the stand-off distance at at least about three inches.

4. A process according to claim 3 wherein the water is pressurized to a pressure within the range between about 600 and 800 psi, heated to a temperature of about 150° F., focused into a jet at a stand-off distance of about 5 inches, and directed onto the propellant surface at an angle relative to the propellant surface of about 45 degrees.

5. A process according to claim 1 wherein the rocket motor case is composed of a composite of resin and a fiber selected from the group consisting of fiberglass, graphite, and aramid fiber.

6. A process according to claim 1 wherein the propellant has a cavity therein which extends along the central axis of the propellant and the water jet is directed onto the surface of the cavity with a helical motion relative to the surface effected by simultaneous motion along the central axis of the propellant and rotary motion about the axis whereby helical shreds of propellant may be carved by the water jet from the cavity surface.

7. A process according to claim 1 further comprises the step of recirculating the water so that it may again be pressurized, focused into a jet, and directed onto the propellant surface.

8. A process according to claim 1 further comprises supporting the rocket case in an inclined position so that the water which has been directed onto the propellant surface may be drained therefrom and the propellant pieces removed.

9. A process according to claim 1 wherein the step of heating the water comprises supplying steam to the water.

10. Apparatus for removing solid propellant which has a cavity therein from a rocket motor case composed of a composite of resin and fiber material, the apparatus comprises means for heating water to a temperature of at least about 150° F., means for controlling the temperature of the water, means for pressurizing the heated water to a pressure within the range of about 600 to 1200 psi, nozzle means for receiving and focusing the heated pressurized water into a jet, means for positioning the nozzle means to direct the water jet onto the propellant cavity surface from a stand-off distance of up to about 20 inches and at an angle relative to the propellant cavity surface which is within the range of about 15 to 45 degrees, and means for moving the nozzle means for re-directing the water jet over the propellant surface whereby pieces of propellant which are cut therefrom may be removed.

11. Apparatus according to claim 10 wherein the rocket motor case is composed of a composite of resin and a fiber selected from the group consisting of fiberglass, graphite and aramid fiber.

12. Apparatus according to claim 10 wherein the propellant cavity extends along the central axis of the propellant, the apparatus further comprises means for moving the nozzle means simultaneously along the central axis of the propellant and about the central axis to effect a helical motion of the water jet relative to the cavity surface whereby helical shreds of propellant may be carved by hhe water jet from the cavity uurface.

13. Apparatus according to claim 12 wherein the rocket motor case is composed of a composite of resin and a fiber selected from the group consisting of fiberglass, graphite, and aramid fiber, and the apparatus further comprises means for supporting the rocket case in an inclined position whereby propellant residue and water which has been directed onto a propellant surface may be drained therefrom, and means for separating the water and propellant reside removed from the case and for recirculating the water to the pressurizing means, and said water heating means comprises steam sparging means.

14. Apparatus according to claim 10 further comprises means for separating the water and propellant residue removed from the case and for recirculating hhe water to the pressurizing means.

15. Apparatus according to claim 10 further comprises means for supporting the rocket case in an inclined position whereby propellant residue and water which has been directed onto a propellant surface may be drained therefrom.

16. Apparatus according to claim 10 wherein said water heating means comprises steam sparging means.

17. Apparatus according to claim 10 further comprises means including a concrete wall having a thickness equal to at least about three feet and positioned between the rocket motor case and said pressurizing means for protecting the pressurizing means in the event of a fire in the rocket motor.

* * * * *